United States Patent
Ihara et al.

(10) Patent No.: US 7,849,235 B2
(45) Date of Patent: Dec. 7, 2010

(54) DMA CONTROLLER, NODE, DATA TRANSFER CONTROL METHOD AND STORAGE MEDIUM

(75) Inventors: Shunichi Ihara, Kawasaki (JP); Yuichi Ogawa, Kawasaki (JP); Terumasa Haneda, Kawasaki (JP); Kazunori Masuyama, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 11/905,373

(22) Filed: Sep. 28, 2007

(65) Prior Publication Data

US 2008/0104341 A1  May 1, 2008

Related U.S. Application Data

(63) Continuation of application No. PCT/JP2005/006504, filed on Apr. 1, 2005.

(51) Int. Cl.
G06F 13/28 (2006.01)
(52) U.S. Cl. .................................................. 710/22
(58) Field of Classification Search .............. None
See application file for complete search history.

(56) References Cited

U.S. PATENT DOCUMENTS

| 5,442,777 | A | 8/1995 | Nakajima et al. | |
|---|---|---|---|---|
| 6,105,080 | A * | 8/2000 | Holt et al. | 710/26 |
| 6,353,619 | B1 * | 3/2002 | Banas et al. | 370/463 |
| 6,538,758 | B1 | 3/2003 | Ikegawa | |
| 7,050,184 | B1 | 5/2006 | Miyamoto | |
| 2002/0062352 | A1 | 5/2002 | Asano et al. | |
| 2003/0188054 | A1 | 10/2003 | Yosimoto et al. | |
| 2004/0215849 | A1 | 10/2004 | Graham et al. | |
| 2005/0232298 | A1 * | 10/2005 | Beverly et al. | 370/463 |

FOREIGN PATENT DOCUMENTS

| JP | 5-334260 | 12/1993 |
|---|---|---|
| JP | 6-019816 | 1/1994 |
| JP | 06-019816 | 1/1994 |
| JP | 7-93233 | 4/1995 |

(Continued)

OTHER PUBLICATIONS

Kravitz et al., High Performance DMA Controller/CPU Interface Mechanism, Feb. 1993, pp. 131-134.*

(Continued)

Primary Examiner—Eron J Sorrell
(74) Attorney, Agent, or Firm—Staas & Halsey LLP

(57) ABSTRACT

In response to a request from a central processing unit (CPU) 11 (i.e., firmware) of a node 10, a transfer control unit 14a of a direct memory access (DMA) controller 14 transmits a message and data to another discretionary node 3 by way of a serial bus 1, a switch 2 or the like. In this event, the firmware stores data to be transmitted, a message, and a descriptor thereof in memory 12. In the case of requesting the transmission of the message, the descriptor contains a flag indicating "whether or not there is a need to wait for a response from the data transmission destination". If the flag is set to ON, the transfer control unit 14a notifies the firmware of a simulated completion immediately instead of waiting for a completion response from the transmission destination node 3.

13 Claims, 10 Drawing Sheets

OTHER PUBLICATIONS

Chinese Office Action issued on Oct. 17, 2008 in corresponding Chinese Patent Application No. 200580049384.5.
Korean official communication issued Nov. 25, 2009 in corresponding Korean application No. 10-2007-7023490.
Notice of Rejection Grounds issued Feb. 23, 2010 in corresponding Japanese Application No. 2007-514345.
Decision of Rejection mailed Jul. 6, 2010 in corresponding Japanese Application No. 2007-514345.

* cited by examiner

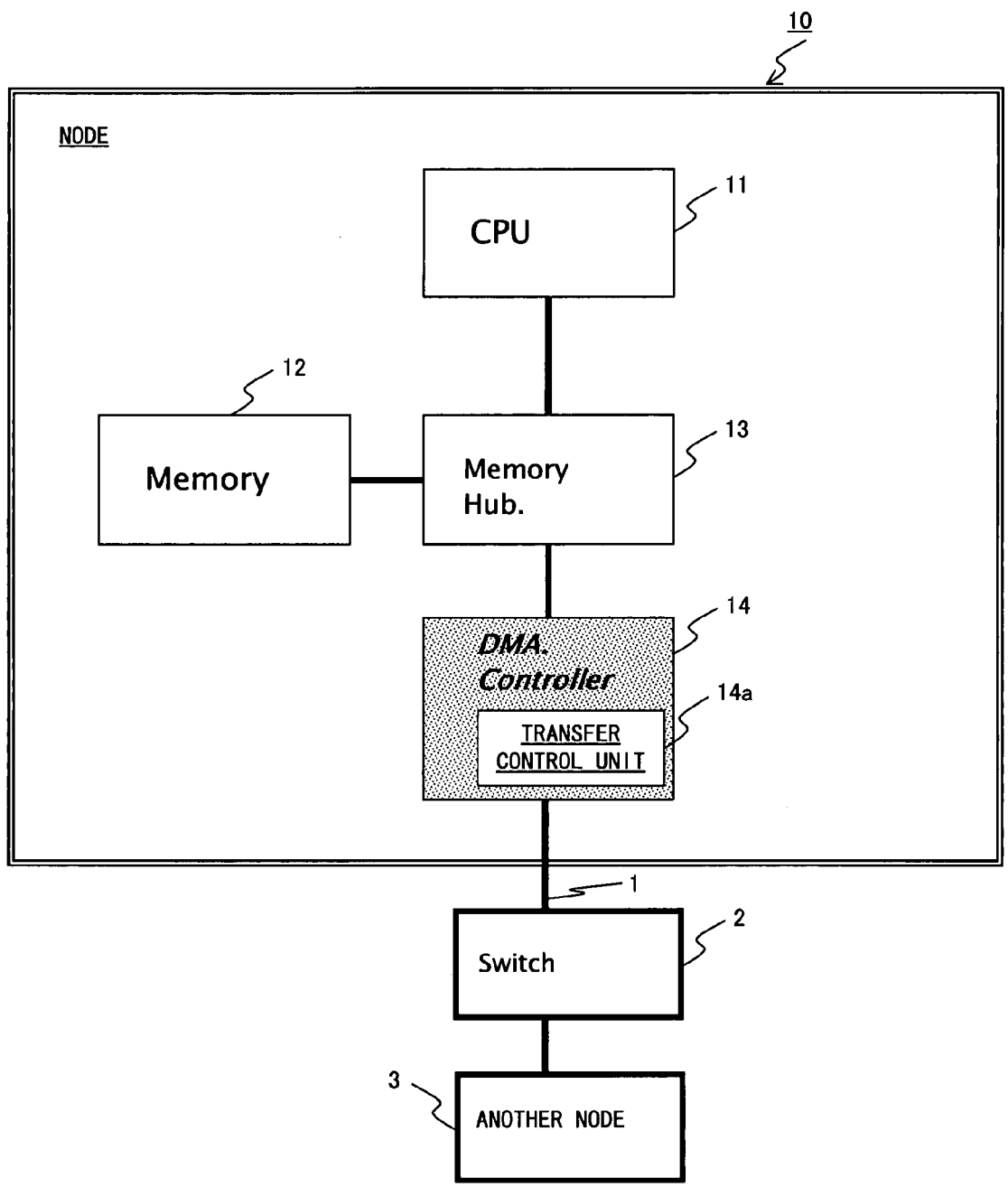
F I G. 1

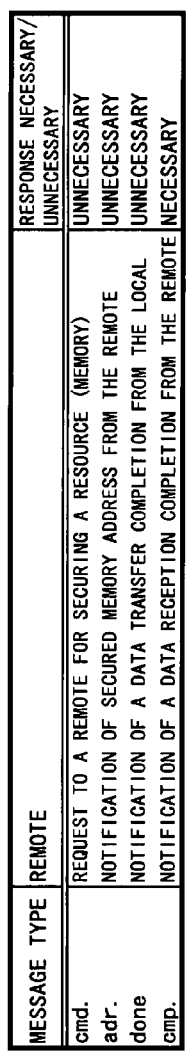
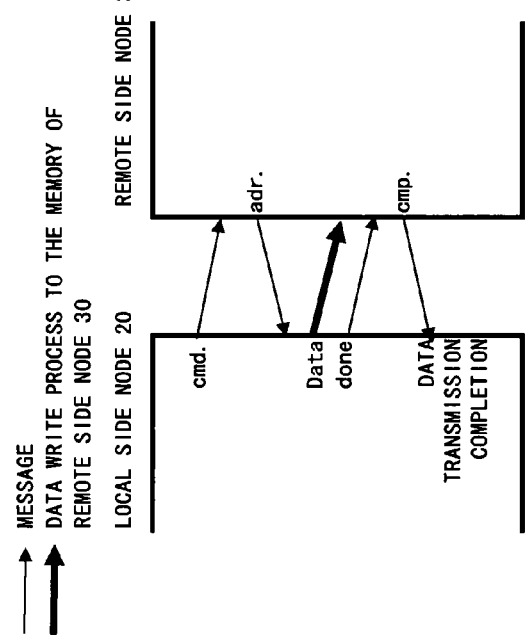
FIG. 4B
FIG. 4A

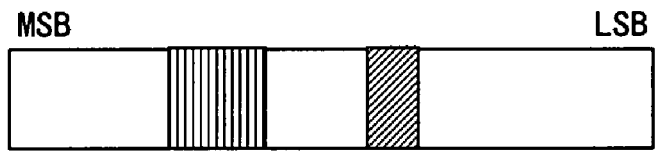
DESCRIPTOR IMAGE DIAGRAM
|||||||||···BIT INDICATING A MESSAGE TYPE
▨···FLAG BIT INDICATING AN END INTERRUPT TIMING
F I G. 5

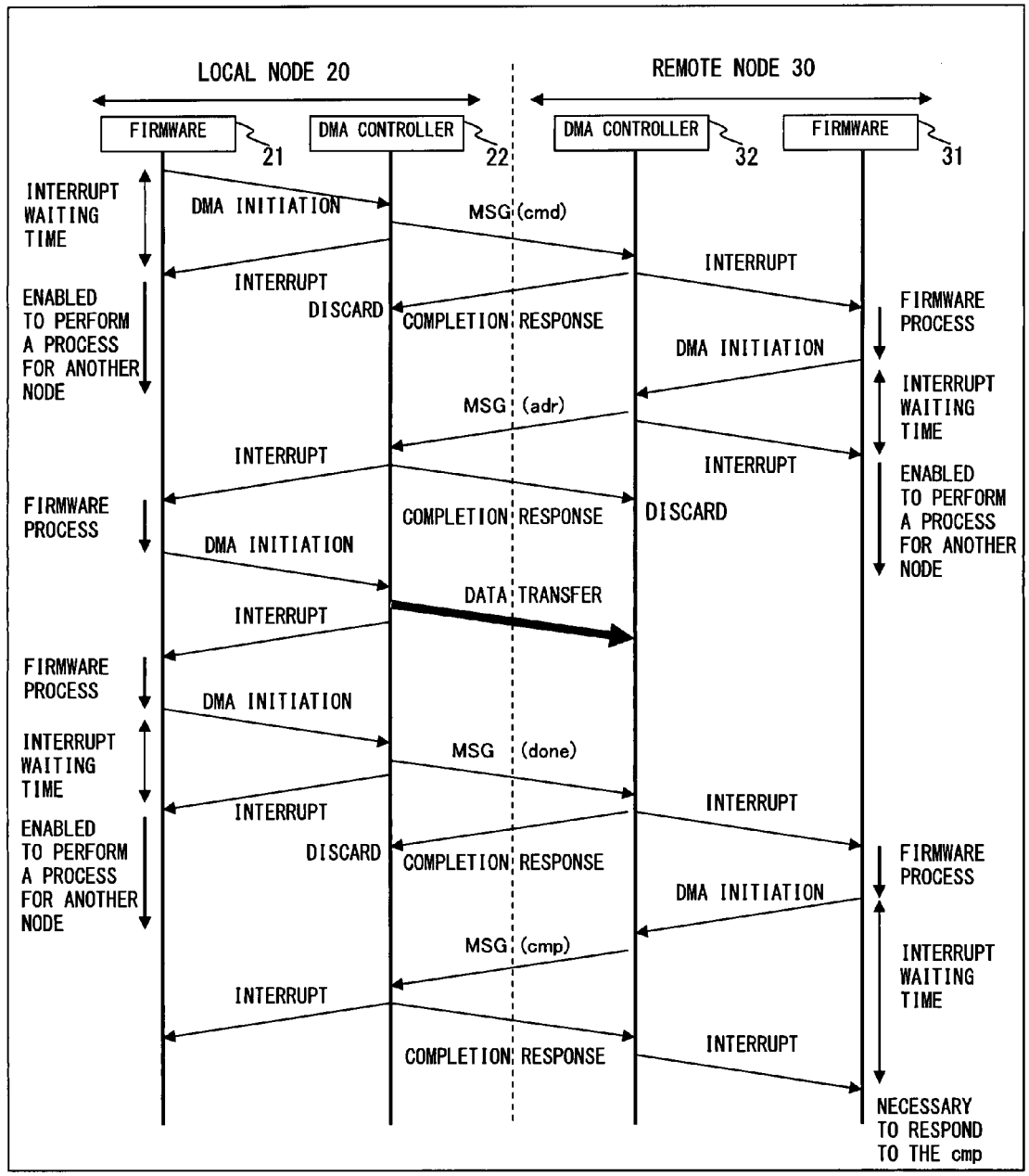
F I G. 7

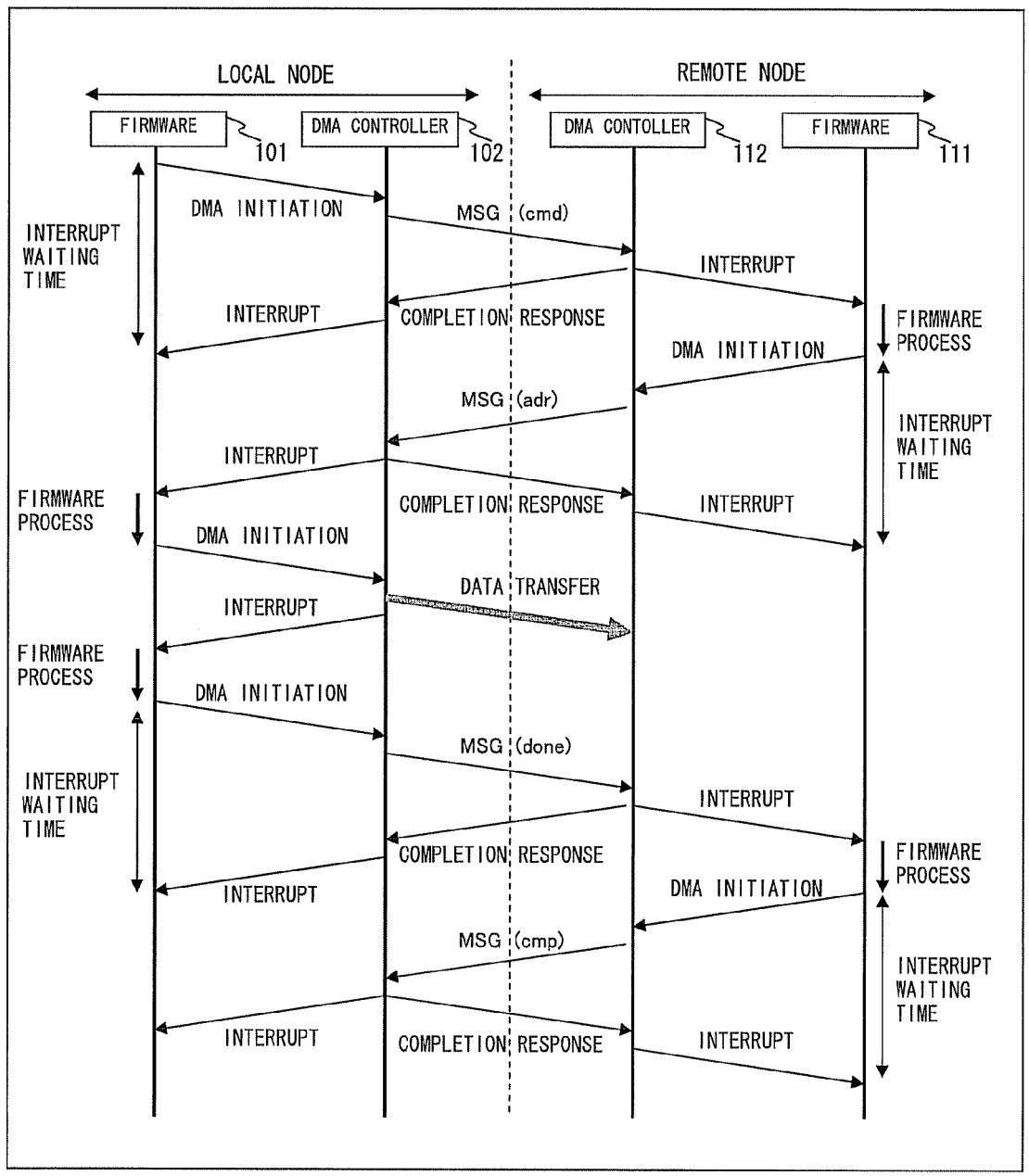
F I G. 9

DMA CONTROLLER, NODE, DATA TRANSFER CONTROL METHOD AND STORAGE MEDIUM

CROSS REFERENCE TO RELATED APPLICATION

This application is a continuation of international PCT application No. PCT/JP2005/006504 filed on Apr. 1, 2005.

BACKGROUND OF THE INVENTION

1. Field of the Invention

The present invention relates to a direct memory access control technique and in particular to a technique for transferring information between random nodes.

2. Description of the Related Art

An effective data transfer between pieces of memories or between an input/output (I/O) device and memory, is a very important matter for improving the performance of a computer system; Direct Memory Access (DMA) is well known as a related technique for this purpose. The DMA, comprising a mechanism in which a DMA control circuit, which is specific use hardware, controls data transfers on the basis of an instruction from the CPU, substitutes for a central processing unit (CPU) in executing a control for transferring data within a computer system.

As an example technique related to the DMA controller, the technique disclosed by reference patent document 1 notes a configuration comprising a master processor (MP), a plurality of processor elements (PE), a DMA controller and the like; this configuration is capable of issuing a plurality of commands in a lump from the MP to the PE and respective DMA controllers, and is also capable of issuing the a subsequent command without waiting for a response to the previously issued command.

Reference patent document 2 discloses a communication control process apparatus comprising a CPU unit for performing a communication control process with a program (i.e., firmware) stored in a memory unit (i.e., an MEM unit) and a DMA unit for transferring data between a communication interface and the MEM unit through a direct memory access without executing a program (i.e., the CPU), wherein a monitor unit for monitoring a process of the firmware is equipped so that the DMA unit transfers data specified by the monitor unit to a trace data storage unit. Further, specifically, a plurality of process modules stored in a firmware storage unit are invested with the respective labels, and the individual process modules report the labels respectively invested to the module themselves to the monitor unit. Further, the monitor unit monitors by retaining the reported label(s), and controls the DMA unit so as to make it transfer, to the trace data storage unit, the detailed data of a process module corresponding to the label(s), if an occurrence of an abnormality is detected.

In addition, reference patent document 3, being related to an inter-processor data transfer control method for use in a register-combination multiprocessor system with the frame sizes being different between the transmission and reception sides, solves the problem of the necessity of executing a program different from a common data transfer process when the last piece of data remains in a register unit if data of the final frame of the transmission side is transferred to the register unit, the transmission side carries out the process of a data transfer completion by sending an END notification to the reception side and the reception side also carries out the process of a data transfer completion by sending an END notification.

According to the technique disclosed by patent document 3, in order to solve this problem, a direct memory access control unit on the transmission side determines, as a transmission completion signal to be added to an interrupt control unit, the logic product of a completion signal at the time the final data is transferred to the register unit and an acknowledge (ACK) is received from the direct memory access control unit on the reception side. The interrupt control unit adds an interrupt signal to the processor on the basis of the transmission completion signal.

In the meantime, a PCI_Express architecture has gathered attention in recent years as, for example, an I/O interface for connecting an input/output apparatus to a host apparatus.

Patent document 1: Laid-Open Japanese Patent Application Publication No. 2002-163239

Patent document 2: Laid-Open Japanese Patent Application Publication No. H07-93233

Patent document 3: Laid-Open Japanese Patent Application Publication No. H05-334260

Here, recent years have witnessed an adoption of the PCI_Express architecture in, for example, a RAID.

RAID is the abbreviation for Redundant Array of Inexpensive Disks or Redundant Array of Independent Disks and is a technique of storage redundancy for managing a plurality of storages (e.g., hard disks) by lumping them together into a single hard disk in order to speed up the process and improve security.

FIG. 8 exemplifies an information processing system including a RAID adopting the PCI_Express architecture.

In the information processing system shown in FIG. 8, a plurality of storage modules 50 constituting the RAID are interconnected by way of PCI_Express serial buses 70 and a PCI_Express switch 80. The PCI_Express switch 80 comprises individual ports (not shown in FIG. 8) for connecting the respective serial buses and performs a packet routing between random ports.

Each storage module 50 comprises a storage (e.g., a hard disk) 53 and a node 51 connected to the storage 53. The node 51 transmits and receives data to and from another storage module 50 by way of the PCI_Express serial bus 70 and PCI_Express switch 80.

Also, when receiving a discretionary request (e.g., a data update request) from a discretionary host computer 60, each storage module 50, being connected to the host computer 60 by way of a channel adaptor (CA) 52, performs a data update for the storage 53 of the module itself and also transfers data to a storage module 50 at, for example, a mirroring destination, thereby making the storage module 50 perform a data update, in accordance with the aforementioned request.

In the following description, a node receiving such a request from the host computer is called a local node, while a node of a data transfer destination such as, for example, a mirroring destination is called a remote node.

Each node comprises a CPU, local memory and a DMA controller (which are not shown in FIG. 8). The CPU is for executing a series of processes by using firmware which is internally built therein, and the firmware, receiving a request from, for example, the host computer, stores the received data temporarily in the local memory and also initiates the DMA controller, thereby requesting it for the data transfer process.

The firmware issues a descriptor when storing the data in the local memory. That is, when the CPU requests the DMA controller to transfer discretionary data, the CPU usually stores the data that is to be requested to be transferred among the local data under the management of the present CPU and also expands, in the local memory, the descriptor containing transfer control information (e.g., a transfer source address, a transfer destination address and transfer data size) to be utilized by the DMA controller. Then, the CPU initiates the DMA controller which, upon initiation, first reads the descriptor to analyze transfer control information, then reads the data stored in the transfer source address (i.e., a storage position of the data in the local memory) for the size of the data, and then transfers the readout data to the transfer destination node. The data also includes various messages in addition to the data to be transferred (e.g., the update data, which is noted as DATA hereinafter).

FIG. 9 is a sequence chart of transferring data between nodes in the configuration shown in FIG. 8.

To begin with, a transfer process of discretionary data transmits and receives a series of messages between the local and remote nodes before and after the process for actually transferring DATA, as shown in the data transfer sequence of FIG. 9. The firmware 101 of the local node stores the messages and descriptor in the local memory each time it makes a DMA controller 102 transmit a single message, thereby requesting the DMA controller 102 to transmit the present message. This prompts the DMA controller 102 to read and analyze the descriptor (of which the storing position is established), thereby transferring the messages to the remote nodes. This is the same on the remote node side. Also, the case of a DATA transmission is similar to the case of a message transmission.

A "cmd" message, shown in FIG. 9, is a request to the remote node for securing a resource (i.e., memory), while an "adr" message is a report of a secured memory address from the remote node. Upon finishing the message transmission and reception in a normal manner before a data transmission, a DATA transmission is carried out. Furthermore, a prescribed message is also exchanged after a DATA transmission. That is, a "done" message shown in the drawing is a report of a data transmission completion to the remote node, and a "cmp" message is a report of a data reception completion from the remote node.

Referring to FIG. 9, having received the "cmd" message, the DMA controller 112 of the remote node notifies the firmware 111 (i.e., the CPU) of the node itself of the reception of the "cmd" message (more specifically, the DMA controller 112 stores the "cmd" message in the local memory and interrupts the firmware 111) and responds back to the DMA controller 102 of the local node with a completion response. Having received the completion response, the DMA controller 102 of the local node notifies the firmware 101 of the node itself of the completion (i.e., interrupts). The firmware 101 of the local node is put into a state of waiting for an interrupt, and is thus unable to perform any other processes in the period from the above described DMA initiation to the receiving of the completion notification.

Meanwhile, having received the notification of receiving the "cmd" message from the DMA controller 112 of the remote node, the firmware 111 of the remote node completes an execution of a prescribed firmware process (i.e., a resource [i.e., memory] securing process in the above example) corresponding to the "cmd" message, followed by requesting the DMA controller 112 to transmit a response "adr" message responding to the "cmd" message. That is, the firmware 111 stores the "adr" message and descriptor in the local memory and initiates the DMA controller 112. The initiated DMA controller 112 transmits the "adr" message to the local node and, having received a completion response to the "adr" message, notifies the firmware 111 of the node itself of the completion (i.e., interrupts the firmware 111). The firmware 111 of the remote node is put into a state of waiting for an interrupt, and is thus unable to perform any other processes in the period from the above described DMA initiation to the receiving of the completion notification.

Also related to the transmission of the "done" message and "cmp" message, which are shown in FIG. 9, the firmware is put into a state of waiting for an interrupt, and is thus unable to perform any other processes in the period from the above described DMA initiation to the receiving of the completion notification.

As described above, either of the nodes is put into a state of waiting for an interrupt and thus is unable to perform any other processes in the period from the time of requesting the DMA controller to transmit a message (i.e., from the initiation of DMA) to the receiving of a completion notification (e.g., for a maximum of approximately 2 milliseconds), which has conventionally not constituted a problem, however.

That is, the above described time period of being in the state of waiting for an interrupt has not conventionally caused a bottleneck in terms of the performance of the apparatus because the time period before a completion response corresponding to the transmitted message is received (i.e., the time of being in the state of waiting for an interrupt) is exceeded by the time period before a CPU (i.e., firmware) becomes ready to transition to another task, in terms of the performance of the CPU, as shown in FIG. 10A.

In recent years, however, the time period before firmware becomes ready to transit to another task has been greatly shortened, as shown in FIG. 10B, due to an improvement in CPU performance, whereas the firmware is put into a state of waiting for an interrupt and is thus unable to perform another process (i.e., another task) until receiving a completion notification as described above, and therefore the time period of being in the state of waiting for an interrupt has become a bottle neck in terms of the performance of the apparatus.

This problem occurs not only in the case of using the PCI_Express architecture but also in a conventional serial interface and in a conventional parallel interface.

The problem for the present invention is to improve latency from the viewpoint of firmware, and in particular to provide a DMA controller, a program therefor, and such, enabling an execution of another process by reducing the time period of waiting for a response by notifying firmware of a simulated response instead of waiting for a response that depends on the type of a transmitted message when exchanging a message that is carried out before and after a data transmission.

SUMMARY OF THE INVENTION

A DMA controller according to the present invention in an information processing system in which a plurality of nodes, each of which comprises a DMA controller, are connected by way of a bus, comprising a data transfer control unit for judging whether or not a message is in need of a completion response from a transmission destination node when receiving a request from firmware of the node itself, transmitting the message to a DMA controller of the transmission destination node by way of the bus, and also notifying the firmware of the node itself of a completion instead of waiting for a completion response from the transmission destination node if the judgment is that the message is not in need of the completion response.

As described above, the DMA controller notifies the firmware of an occurrence of a simulated completion response instead of waiting for a completion response from the transmission destination node, thereby enabling the firmware to shift to another process.

As an example, a message not in need of a completion response from the transmission destination node is a message for which the occurrence of a certain message is to be sent from the transmission destination node after the transmission of the present message. Therefore, it is possible to judge an occurrence of the transmitted message arriving at the transmission destination node indirectly by using the event of receiving a response message from the transmission destination node. If a response message is not received even after a prescribed passage of time from the transmission of the message, an error process may be carried out.

As such, the DMA controller according to the present invention is contrived to enable an improvement in the process efficiency of firmware.

BRIEF DESCRIPTION OF THE DRAWINGS

FIG. 1 is a diagram of a configuration of a node in an information processing system according to the present embodiment;

FIG. 4A is a diagram showing a data transfer sequence of various messages; and FIG. 4B is a diagram showing the function of individual messages and a list of "necessities of response from the data transmission destination";

FIG. 5 is a diagram of an image of a descriptor according to the present embodiment;

FIG. 7 exemplifies a data transfer sequence according to the present embodiment;

FIG. 9 exemplifies a sequence of a conventional data transfer; and

DESCRIPTION OF THE PREFERRED EMBODIMENTS

The following is a description of the preferred embodiment of the present invention by referring to the accompanying drawings.

Note that the present embodiment is described by exemplifying a case of using a PCI_Express architecture for connecting between DMA controllers; the present invention, however, is also applicable to a configuration of using a discretionary conventional serial interface or parallel interface.

FIG. 1 is a diagram of a configuration of a node in an information processing system according to the present embodiment.

Figure 8:
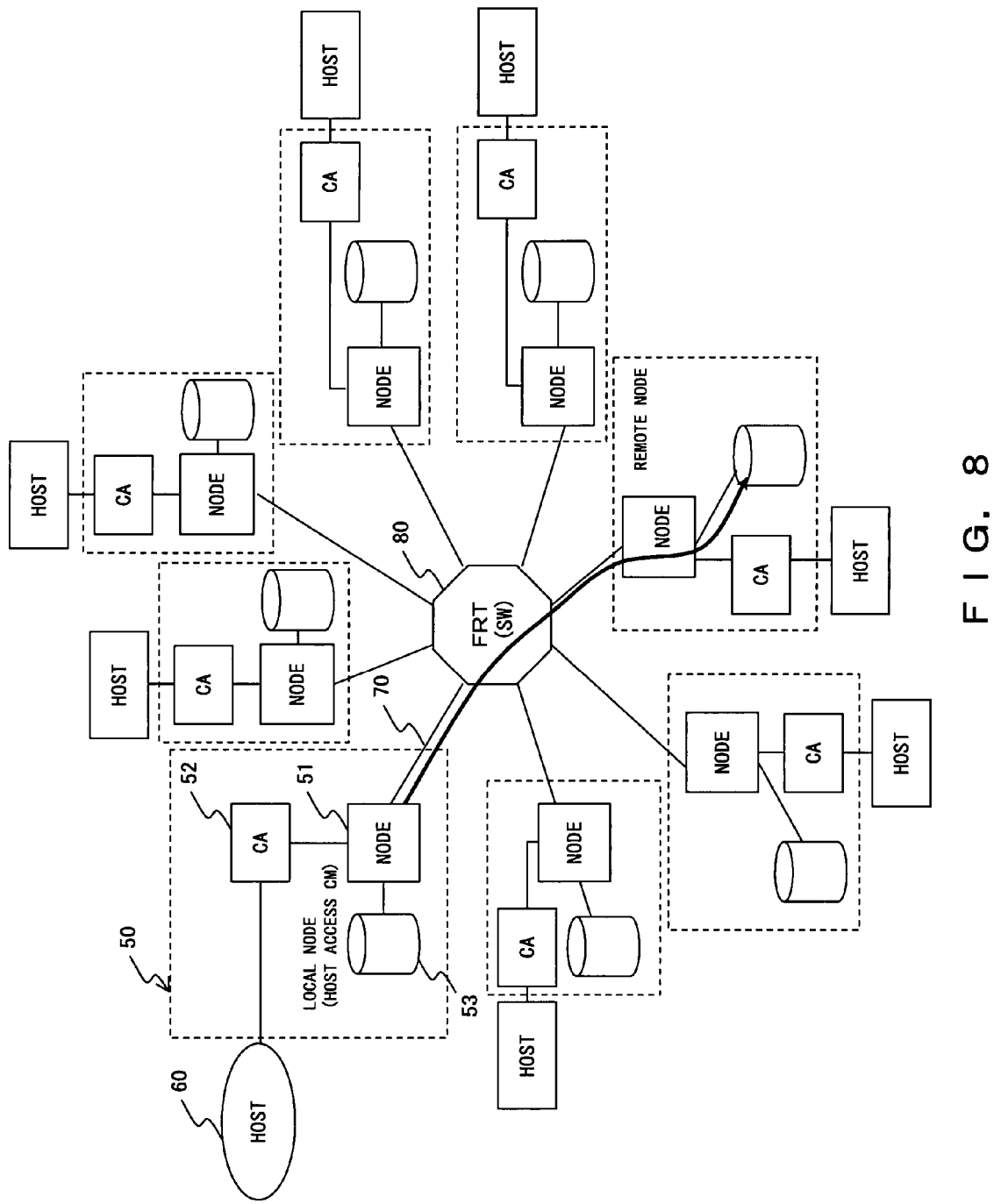
FIG. 8 exemplifies a configuration of a conventional RAID and such.
Figure 10A:
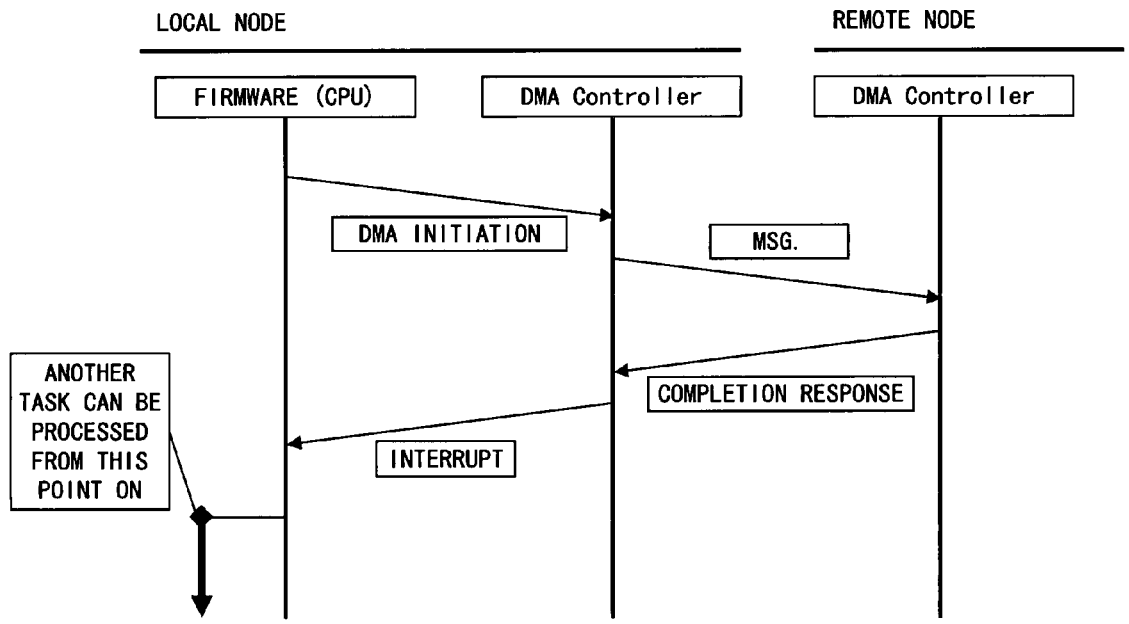
FIGS. 10A and 10B are diagrams describing a conventional problem.
Figure 10B:
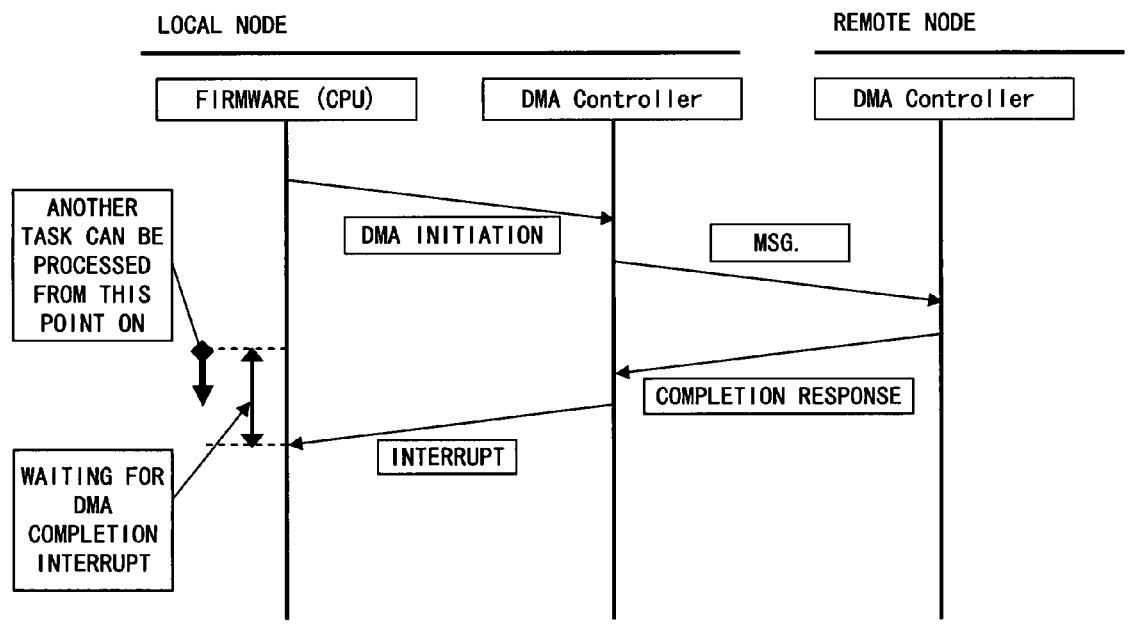

The configuration of the entirety of the information processing system according to the present embodiment is approximately the same as the conventional configuration described in FIG. 8. FIG. 1 exemplifies a configuration of each node for use in an information processing system as shown in FIG. 8.

The node 10 shown in FIG. 1 comprises a CPU 11, memory 12, a memory hub 13 and a DMA controller 14.

The memory 12 is local memory under the management of the CPU 11, which reads and writes data from and to the memory 12 by way of the memory hub 13. Also, the DMA controller 14 reads and writes data from and to the memory 12 by way of the memory hub 13. The following description does not specifically refer to the memory hub 13; a data read/write from/to the memory 12 is always carried out by way of the memory hub 13.

When making a request to the DMA controller 14 for a data transfer of discretionary data, the firmware incorporated into the CPU 11 stores the data to be transferred in the memory 12 and also expands the above described descriptor in the memory 12. A transfer control unit 14a of the DMA controller 14 refers to the descriptor and transfers the data to a discretionary node 3 by way of a serial bus 1, switch 2 or the like on by, for example, the PCI_Express or the like, on the basis of the information of the descriptor. Note that the data includes various pieces of data in addition to the actual data (i.e., DATA), and a prescribed message exchange is carried out before and after an actual data (i.e., DATA) transfer process as described above. Incidentally, the configuration of the transfer control unit 14a is an addition of the function of the present invention to a message channel (MSCH) block of a DMA controller.

The configuration of other nodes 3 are the same as that of the node 10.

The operation itself described above is approximately the same as that of the conventional configuration; the difference from the conventional configuration is that the present embodiment is configured such that information (such as a flag) indicating whether or not "in need of waiting for a response from a data transfer destination" is included in the descriptor of a message if the data to be requested for a transmission (i.e., to be stored in the memory 12) is the message, so that the transfer control unit 14a of the DMA controller 14 refers to the flag and carries out a later described transfer control process. That is, the difference from the conventional technique is that the DMA controller 14 notifies the firmware of a simulated completion instead of waiting for a response from the data transfer destination in accordance with the type of a message to be transferred.

The actual data (i.e., DATA) transfer process per se is not related to the characteristics of the present invention and therefore the following description deals essentially with the case of transmitting and receiving a message.

Figure 2:
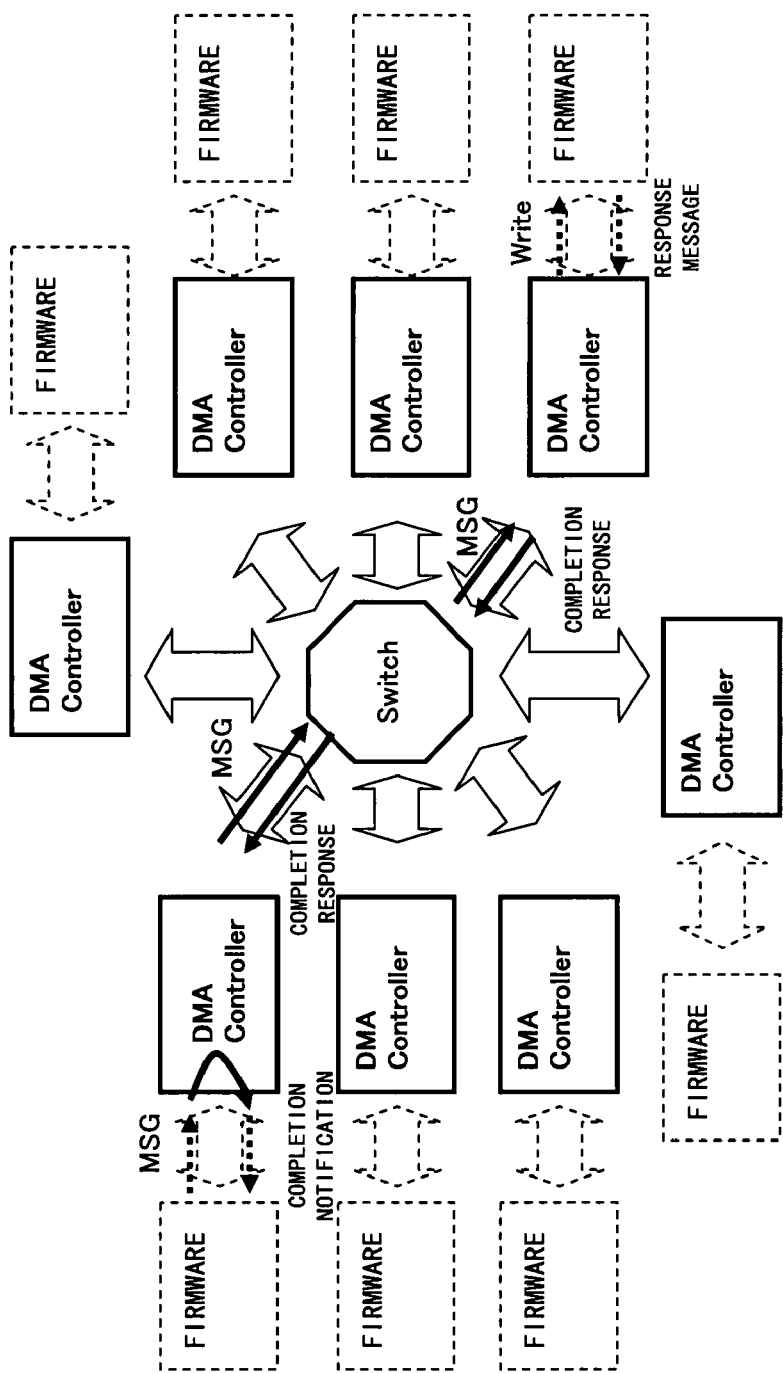
FIG. 2 is a diagram describing a process for transmitting and receiving data (i.e., a message) between nodes (part 1)

FIG. 2 exemplifies a configuration of the entirety of an information processing system such as a RAID interconnecting a plurality of nodes by using a serial interface such as PCI_Express. The configuration of the entirety per se is approximately the same as the conventional configuration described in FIG. 8, and here accordingly shows only the firmware (i.e., the CPU 11) and DMA controller 14 for an individual node.

The basic operation of the configuration shown in FIG. 2 has already been described in FIG. 8. Simply stated, having been requested by the firmware of a discretionary node to transmit a message, the DMA controller of the node itself transmits the message (i.e., MSG) to the DMA controller of the message transfer destination node by way of the serial bus 1 and switch 2.

Figure 3:
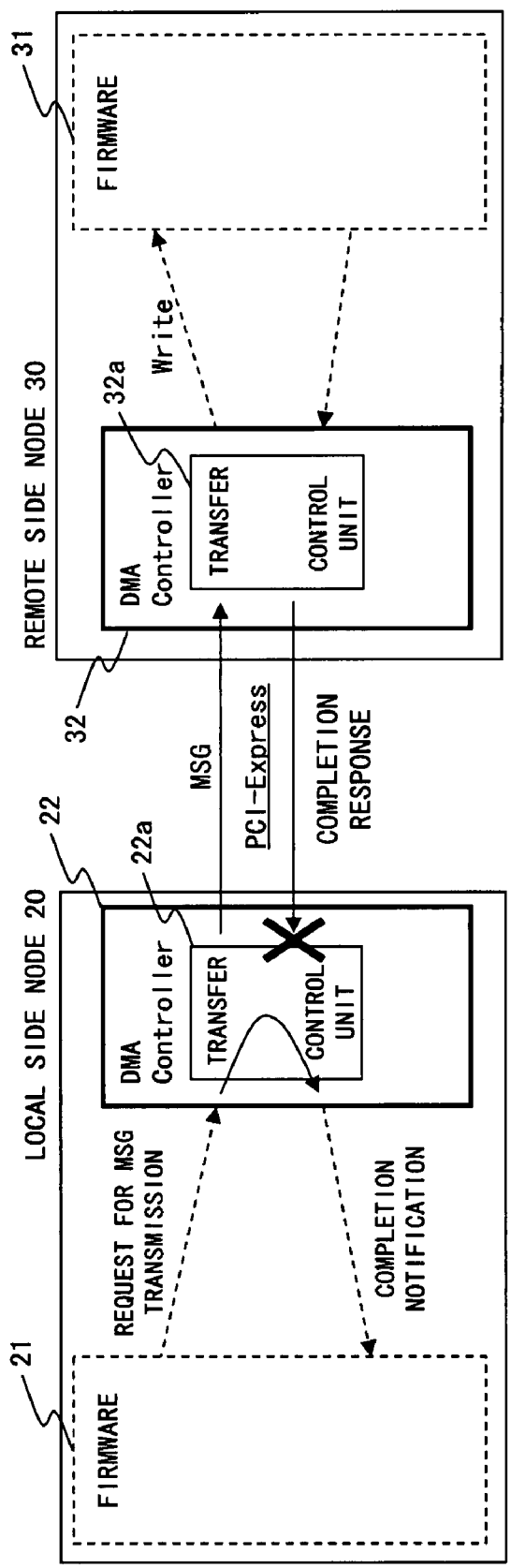
FIG. 3 is a diagram describing a process for transmitting and receiving data (i.e., a message) between nodes (part 2)

Incidentally, such a data transmission source node is called a local side node 20 and a data transmission destination node is called a remote side node 30, as shown in FIG. 3 in the following description. Also, the DMA controller, its transfer control unit and firmware at the local side node 20 are given the labels 22, 22a and 21, respectively, as shown in FIG. 3.

Likewise, the DMA controller, its transfer control unit and firmware at the remote side node 30 are given the labels 32, 32a and 31.

The transfer control unit 32a of the DMA controller 32 of the remote side node 30, having received the message (i.e., MSG), notifies (i.e., interrupts) the firmware of the node itself and also sends a completion response to the local side node 20. The transfer control unit 22a of the DMA controller 22 of the local side node 20, having received the completion response, notifies (i.e., interrupts) the firmware 21 of the node itself of the completion. The present embodiment is configured such that the transfer control unit 22a of the DMA controller 22 of the local side node 20 notifies the firmware 21 of the node itself of the completion immediately, instead of waiting for a completion response in accordance with the type of the transmitted message. This configuration makes it possible to reduce the interrupt waiting time of the firmware 21, thus enabling a shift to another process.

Meanwhile, the firmware 31 of the remote side node 30 creates and transmits a response message to the above described message, in which case the transfer control unit 32a of the DMA controller 32 of the remote side also notifies the firmware 31 of the node itself of the completion immediately instead of waiting for a completion response in accordance with the type of response message, as in the above described case.

FIG. 4A shows a specific example of messages transmitted and received between the local side node 20 and remote side node 30.

FIG. 4A exemplifies a data transfer sequence of various messages associated with a data transmission of certain actual data (i.e., DATA).

In the example shown, the local side node 20 first transmits a "cmd" message to the remote side node 30, to which the remote side node 30 returns an "adr" response message. The local side node 20, receiving the "adr" response message in a normal manner, transfers the actual data (i.e., DATA). Then, the local side node 20 transmits a "done" message to the remote side node 30, to which the remote side node 30 returns a "cmp" response message. If the local side node 20 receives the "cmp" response message normally, the present data transmission process is completed.

FIG. 4B shows the functions of individual messages shown in FIG. 4A and a list of the "necessities of response from the data transmission destination".

There are four types of messages shown in FIG. 4A: cmd, adr, done and cmp. The functions of the various message types have already been described in the conventional technique and are as shown in FIG. 4B. That is, "cmd" is a request from the local node to the remote node for securing a resource (i.e., memory). "adr" is a notification of a secured memory address, which is returned from the remote node. "done" is a notification of a data transfer completion from the local node to the remote node. "cmp" is a notification of data reception completion, which is given as a response from the remote node.

Here, in case of the messages other than "cmp", which is the final message of a data transfer sequence, if the transmission destination node has received the message normally, a response message is returned from the transmission destination node and therefore reception of the response messages makes it possible to confirm indirectly the arrival of the present message at the transmission destination node. This makes it unnecessary for all the messages other than "cmp" to receive a response; only "cmp" is in need of a response according to this example, as shown in FIG. 4B.

As described above, whether or not a message is in need of a response is known in advance for each type of individual message, and therefore it is possible to report from the firmware to the DMA controller whether or not a response is needed by making the firmware retain the information shown in FIG. 4B in advance. That is, the present embodiment is configured to include, in a descriptor to be expanded in the memory 12, the type of the message and a flag (i.e., a flag bit indicating the end interrupt timing) indicating whether the message is in need of a response, if the data stored in the memory 12 is a message, as shown in FIG. 5. The descriptor of course includes information on the position at which data (i.e., a message) is stored and the size of the data, as in the case of the conventional technique; the description herein omits it, however.

As an example, when storing a "cmd" message in a data storage zone of the memory 12, the firmware expands a descriptor corresponding to the "cmd" message in the memory 12. Information on the stored position (i.e., the head address), data size and such of the "cmd" message is included in the descriptor so as to enable the transfer control unit 14a of the DMA controller 14 to read and analyze the descriptor as a process of FIG. 6 (to be described later), thereby reading the "cmd" message and transmitting it. Further, the present embodiment is also configured to enable a judgment of whether or not to wait for a response to the "cmp" message by using the flag included in the descriptor.

The CPU 11 (i.e., the firmware) sets or resets the flag of a descriptor in accordance with the type of message stored in the memory 12 when expanding the descriptor in the memory 12. Here, the flag is set (to ON) if a response is not needed.

Figure 6:
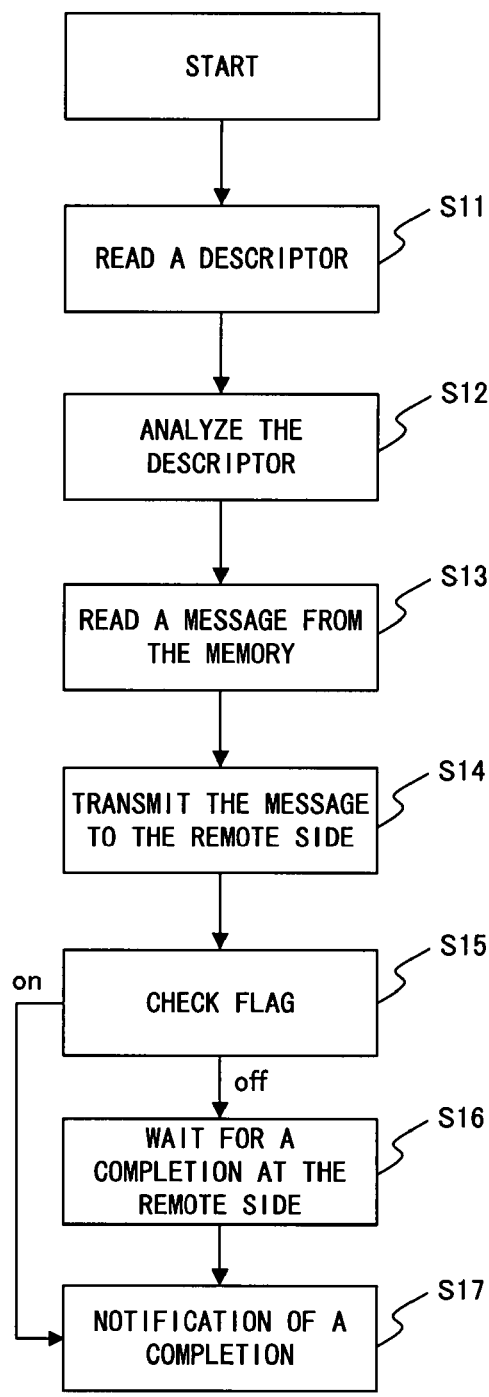
FIG. 6 is an operation flow of a DMA controller according to the present embodiment.

Next, the transfer control unit 14a of the DMA controller 14, being initiated by the CPU 11 (i.e., the firmware), executes the process shown in FIG. 6.

The process shown in FIG. 6 may be implemented by using hardware, or by using software. In the case of implementing it by using hardware, the only requirement is to add, to a conventional hardware configuration, a circuit comprisal for referring to the flag, performing a conventional operation if the flag is set to OFF, and generating an interrupt to the firmware immediately after a message transmission if the flag is set to ON.

Here, the process shown in FIG. 6 is described as an implementation by using software. In the case of implementing it by software, the DMA controller comprises a CPU and memory (which are not shown in FIG. 6) so that a program for implementing the process shown in FIG. 6 is stored in the memory, and the CPU reads and executes the program. A function unit for implementing the data transfer process shown in FIG. 6 is equivalent to the transfer control unit 14a.

The data transfer process shown in FIG. 6 is carried out every time the DMA controller is initiated by the firmware. Note that the present embodiment is described by exemplifying a case of the local side node 20 transmitting a message to the remote side node 30; a similar process, however, is carried out when the remote side node 30 transmits a message to the local side node 20.

Referring to FIG. 6, the transfer control unit 22a of the DMA controller 22 first reads a descriptor from the memory (step S11) (abbreviated as "S11" hereinafter) and analyzes the descriptor (S12), thereby reading a message from the memory (S13) and transmitting the present message to the remote side node 30 (S14). Also, having checked the flag (S15) when analyzing the descriptor, the transfer control unit 22a notifies the firmware 21 of a completion immediately (S17), instead of waiting for a completion response from the remote side node 30 if the flag is set to ON. Contrarily, if the flag is set to OFF, it waits for a completion response from the remote side node 30 (S16), then notifies the firmware 21 of a completion (S17) when receiving a completion response.

Performing such a transfer control causes the data transfer sequence between the local side node 20 and remote side node 30, to be, for example, as shown in FIG. 7.

Referring to FIG. 7, when the firmware 21 (i.e., the CPU) of the local side node 20 initiates the DMA controller 22, the DMA controller 22 refers to the descriptor and transmits the "cmd" message to the remote side node 30 and also carries out an interrupt (i.e., a notification of completion) to the firmware 21 instead of waiting for a completion response from the remote side node 30 because the flag corresponding to the "cmd" message is set to ON. This enables the firmware 21 to, for example, carry out a process for another node or the like. Then the DMA controller 22, receiving a completion response from the remote side node 30, discards the response.

In the meantime, receiving the "cmd" message, the DMA controller 32 of the remote side node 30 carries out the completion response and also performs an interrupt (i.e., a notification of receiving the "cmd" message) on the firmware 31 of the node itself. This prompts the firmware 31 of the remote side node 30 to execute a prescribed process in accordance with the "cmd" message and to execute the process for transmitting an "adr" response message, followed by initiating the DMA controller 32. The DMA controller 32 refers to the descriptor, transmits the "adr" message to the local side node 20 and also executes an interrupt (i.e., a completion notification) on the firmware 31 instead of waiting for a completion response from the local side node 20 because the flag corresponding to the "adr" message is set to ON.

This enables the firmware 31 to shift to another process, as in the case of the firmware 21.

Having received the "adr" message, the DMA controller 22 executes an interrupt (i.e., a notification of receiving the "adr" message) on the firmware 21, resulting in a DATA transfer being carried out. If an "adr" message is not received after an elapse of a predetermined time period after requesting transmission of the "cmd" message for any reason, the firmware is configured to detect a timeout. As such, if a response message being returned from the transmission destination is determined to have occurred for a transmission of a certain message as a data transfer sequence, it is possible to judge indirectly the fact that the present transmitted message has not arrived at the transmission destination by the fact that a response message has not been sent over therefrom.

Therefore, there is no particular problem in executing a simulated interrupt to the firmware instead of waiting for a completion response (i.e., without checking the result of a message transmission) by putting aside an error process resulting from detecting the above described timeout, except for in a case in which there is no response message from the transmission destination even when it has received the transmitted message normally, that is, when the transmitted message is the final massage of the data transfer sequence ("cmp" in the above example).

Referring to FIG. 7, the flag is set to ON, which is related to the "done" message, as in the case of the "cmd" message, and the DMA controller 22 accordingly executes an interrupt to the firmware 21 instead of waiting for a completion response from the remote side node 30.

Comparably, in the case of the "cmp" message, which is the final message within the data transfer sequence shown in the drawing, the DMA controller 32, having transmitted a "cmp" message to the local side node 20, waits for a completion response and, when the completion response is received, executes an interrupt (i.e., a completion notification) on the firmware 31 since the flag is reset to OFF.

As described above, the DMA controller according to the present embodiment is configured to notify the firmware of a simulated response instead of waiting for a response in accordance with the type of transmitted message, especially when exchanging a message carried out before and after a data transfer, thereby enabling a reduction in the time of waiting for a response and shifting to execute another process. This configuration therefore enables the firmware to reduce wasteful waiting time waiting for the arrival of the response and to improve the process efficiency.

What is claimed is:

1. A direct memory access controller in a first node in an information processing system, comprising
    a data transfer control unit configured
        to judge whether or not a first message is in need of a completion response from a second node in the information processing system using a response timing flag indicating end interrupt timing in a descriptor, when receiving a request to transmit the first message to the second node from firmware of the first node,
        to transmit the first message to another direct memory access controller that is included in the second node by way of a bus,
        to notify the firmware of a completion of transmission of the first message before the direct memory access controller receives the completion response from the second node if the data transfer control unit judges that the first message is not in need of the completion response, and
        to notify the firmware of the completion of transmission of the first message after the direct memory access controller receives the completion response from the second node if the data transfer control unit judges that the first message is in need of the completion response.

2. The direct memory access controller according to claim 1, wherein
    when requesting the data transfer control unit to transmit the first message, the firmware passes on, to the data transfer control unit, the descriptor of the first message together with the first message,
    the end interrupt timing is set depending on whether or not the first message is in need of the completion response from the second node, and
    the data transfer control unit refers to the response timing flag to judge whether or not the first message is in need of the completion response.

3. The direct memory access controller according to claim 2, wherein
    the first message is not in need of the completion response if a second message is determined to be transmitted from the second node to the first node after the transmission of the first message.

4. The direct memory access controller according to claim 3, wherein
    the bus is a serial bus according to a peripheral component interconnect express architecture.

5. The direct memory access controller according to claim 4, wherein
    a plurality of buses including the bus interconnect a plurality of nodes including the first and the second nodes and
    the plurality of nodes and the plurality of buses configure a redundant array of inexpensive disks or a redundant array of independent disks.

6. The direct memory access controller according to claim 1, wherein
the first message is not in need of the completion response if a second message is determined to be transmitted from the second node to the first node after the transmission of the first message.

7. The direct memory access controller according to claim 1, wherein
the bus is a serial bus according to a peripheral component interconnect express architecture.

8. The direct memory access controller according to claim 1, wherein
the response timing flag indicates the end interrupt timing depending on whether or not the first message is a final message of a data transfer sequence including a plurality of messages, and
if the first message is not the final message, the response timing flag indicates the end interrupt timing to cause the data transfer control unit to judge that the first message is not in need of the completion response.

9. The direct memory access controller according to claim 8, wherein
the first message is not in need of the completion response if a second message is determined to be transmitted from the second node to the first node after the transmission of the first message.

10. The direct memory access controller according to claim 9, wherein
the bus is a serial bus according to a peripheral component interconnect express architecture.

11. A node in an information processing system, comprising
a first direct memory access controller configured
to judge whether or not a message is in need of a completion response from another node in the information processing system using a response timing flag indicating end interrupt timing in a descriptor, when receiving a request to transmit the message to the other node from firmware of the node,
to transmit the message to a second direct memory access controller that is included in the other node by way of a bus,
to notify the firmware of a completion of transmission of the message before the first direct memory access controller receives the completion response from the other node if the first direct memory access controller judges that the message is not in need of the completion response, and
to notify the firmware of the completion of transmission of the message after the first direct memory access controller receives the completion response from the other node if the first direct memory access controller judges that the message is in need of the completion response.

12. A data transfer control method performed by a first direct memory access controller in a first node in an information processing system, the data transfer control method comprising:
judging whether or not a message is in need of a completion response from a second node in the information processing system using a response timing flag indicating end interrupt timing in a descriptor, when receiving a request to transmit the message to the second node from firmware of the first node,
transmitting the message to a second direct memory access controller that is included in the second node by way of a bus,
notifying the firmware of a completion of transmission of the message before the first direct memory access controller receives the completion response from the second node if the message is judged in the judging not to be in need of the completion response, and
notifying the firmware of the completion of transmission of the message after the first direct memory access controller receives the completion response from the second node if the message is judged in the judging to be in need of the completion response.

13. A computer-readable storage medium storing a program to direct a first direct memory access controller in a first node in an information processing system to perform a process, the process comprising:
judging whether or not a message is in need of a completion response from a second node in the information processing system using a response timing flag indicating end interrupt timing in a descriptor, when receiving a request to transmit the message to the second node from firmware of the first node,
transmitting the message to a second direct memory access controller that is included in the second node by way of a bus,
notifying the firmware of a completion of transmission of the message before the first direct memory access controller receives the completion response from the second node if the message is judged in the judging not to be in need of the completion response, and
notifying the firmware of the completion of transmission of the message after the first direct memory access controller receives the completion response from the second node if the message is judged in the judging to be in need of the completion response.

* * * * *